United States Patent [19]
May

[11] Patent Number: 5,903,625
[45] Date of Patent: May 11, 1999

[54] AUTOMATIC POLLING OF DIRECT ACCESS TEST UNIT TO OBTAIN USAGE DATA

[75] Inventor: Vernon E. May, Greensboro, N.C.

[73] Assignee: Harris Corporation, Melbourne, Fla.

[21] Appl. No.: 08/852,996

[22] Filed: May 8, 1997

[51] Int. Cl.[6] .............................. H04M 1/24; H04M 3/08; H04M 15/00
[52] U.S. Cl. ................................ 379/21; 379/29; 379/34; 379/140
[58] Field of Search .................................. 379/1, 5, 6, 21, 379/22, 23, 24, 26, 27, 28, 29, 30, 32, 34, 130, 131, 140, 141; 324/500, 512; 370/241, 250

[56] References Cited

U.S. PATENT DOCUMENTS

| | | | |
|---|---|---|---|
| 4,639,557 | 1/1987 | Butler et al. | 397/29 |
| 4,819,261 | 4/1989 | Takeda et al. | 379/32 |
| 4,837,811 | 6/1989 | Butler et al. | 379/21 |
| 4,922,520 | 5/1990 | Bernard et al. | 379/88 |
| 5,241,581 | 8/1993 | Hermosilla-Ortega et al. | 379/27 |
| 5,353,327 | 10/1994 | Adari et al. | 379/22 |
| 5,375,159 | 12/1994 | Williams | 379/29 |
| 5,377,259 | 12/1994 | Butler et al. | 379/21 |
| 5,511,108 | 4/1996 | Severt et al. | 379/21 |
| 5,533,093 | 7/1996 | Horton et al. | 379/21 |

*Primary Examiner*—Paul Loomis
*Attorney, Agent, or Firm*—Charles E. Wands

[57] ABSTRACT

A line-conditioning test unit query system automatically queries direct access test units of respective telephone facilities that are used for conditioning and testing telephone lines, to obtain data representative of usage by the test units. A centralized usage tracking or polling processor is programmed to execute a polling routine, which sequences through dialing directory listing each test unit of the network. The polling processor generates tone signal-formatted commands to which the test units respond with synthesized voice messages containing usage parameter data. Using a speech-to-text conversion operator, the routine converts synthesized voice responses from the queried DATUs into digital data for storage in a relational database, from which usage reports are derived.

26 Claims, 2 Drawing Sheets

5,903,625

1
AUTOMATIC POLLING OF DIRECT ACCESS TEST UNIT TO OBTAIN USAGE DATA

FIELD OF THE INVENTION

The present invention relates in general to communication systems, and is particularly directed to a new and improved test unit query scheme for automatically querying direct access test units of respective telephone facilities and deriving therefrom digital data representative of usage by the test units.

BACKGROUND OF THE INVENTION

The U.S. Pat. to A. Chan et al, No. 4,841,560, and the U.S. Pat. to D. Heins et al, No. 5,528,660, assigned to the assignee of the present application and the disclosures of which are herein incorporated, describe line-conditioning devices that allow a single field technician or craftsperson to test a subscriber line without requiring participation by another technician at the far end of the line of interest (in the central office). For this purpose, such line-conditioning devices are installable in telephone system facilities (central offices) of a network, and are configured to be remotely called or accessed 'directly' by a craftsperson for the purpose of performing prescribed line-conditioning operations that are observable by the craftsperson's test set. Such a line-conditioning device is typically referred to as a direct access test unit or DATU.

More particularly, as diagrammatically illustrated in FIG. 1, a typical telephone network facility such as a central office 12 includes a central office switch 14, central office test devices 16, and a direct access test unit (DATU) 18. The central office test devices 16 are capable of providing an interface with various operational support systems of a data center 20, such as a service vehicle dispatch, outside plant record database, automated testing systems, and electronic network schematics.

The line-conditioning device (DATU) 18 provides the craftsperson with the ability to interactively apply test signals to a telephone line under test, and thereby selectively conduct a number of tests of a line under test (LUT), by invoking specified key combinations (sequences) from the craftsperson's telephone test set 22, which cause the transmission of tone signals (dual tone multi-frequency (DTMF) signals) to which the DATU is programmed to respond. Communications from a respective DATU to the craftsperson's test set are effected by means of synthesized voice messages sourced from the DATU, which are then audibly or visually presented to the craftsperson, depending upon the type of communications device being employed.

In order to enable the telephone service provider to monitor DATU usage, each DATU includes a set of usage parameter registers or counters that keep a record of every access by a test set. To monitor DATU usage, it has been conventional practice for network personnel to access a respective DATU within a bank of such circuits (which may literally involve hundreds of DATUs) by manually keying in tone signal-formatted messages using essentially the same procedure employed by a field technician to access a DATU for testing test a line. Since response messages produced by the DATU are formatted as synthesized voice reply messages, it is necessary for the individual accessing the DATU to listen to the reply message and manually record its contents, so that they may be entered into a spreadsheet database for subsequent analysis. Once the contents of the usage registers have been read, they are cleared. To access another DATU, the operator must then repeat the procedure.

2

Because conventional usage access to each DATU is manually controlled, it is subject to user errors, is labor-intensive and is extremely time consuming. (Indeed, it is not uncommon for system personnel to spend on the order of four hundred hours or more per month calling into all the DATUs of a system).

SUMMARY OF THE INVENTION

In accordance with the present invention, rather than require system operation personnel to manually call each DATU, one at a time, and manually record the contents of usage parameter reply messages, a centralized usage tracking station is programmed to execute the automatic DATU polling routine of the present invention. As will be described, this inventive polling routine is operative to automatically sequence through each test unit of the network, as listed in a DATU dialing directory, and to convert synthesized voice responses from the sequentially queried DATUs into digital data for storage in a relational database, from which usage reports may be generated.

For this purpose, the automated test unit polling scheme of the present invention may be located in any facility from which calls may be placed to test units of the network; the polling facility need not be part of the network, per se. To initiate the DATU usage polling routine, the control processor accesses a dialing directory of test units contained in a DATU database. The DATU database includes polling-associated parameters, such as the time of day/night at which the DATUs are to be polled, the frequency at which the polling is to take place, and a task list of action items to be executed, such as usage parameter data acquisition, setting/clearing parameter registers, changing the password of the DATU, etc.

When the polling routine steps to the directory number of a test unit, a call is placed to that test unit. As will be described, call placement and information access signalling from the polling processor is accomplished in the same manner as access by a craftsperson's test set, namely via a DTMF signalling format. Since reply messages generated by the test unit are formatted as synthesized voice signals, the polling processor employs a speech-to-text conversion routine to translate the synthesized voice messages transmitted from the queried test unit into a digitized text format for storage and subsequent analysis. Preferably, the speech-to-text conversion routine is one that is programmable with respect to when the conversion process is to begin and the number of digits to be converted. This allows the routine to be customized so that it converts only a portion of a synthesized voice response message from the polled DATU.

When the polled DATU answers, the routine proceeds to access the usage parameter registers of the test unit. Upon password-controlled access being accepted by the DATU, the polling processor transmits a DTMF command sequence associated with a particular usage parameter stored by the DATU. In reply, the queried test unit generates a synthesized voice response message that contains the contents of the particular usage parameter register being accessed.

The synthesized voice, usage parameter response message generated includes a precursor sentence portion of a prescribed duration, followed by a parametric data portion containing a sequence or set of raw numeric characters or digits. The polling processor has a prior knowledge of the duration of each precursor sentence portion. Since the speech-to-text conversion routine is programmable with respect to when the conversion process is to begin and the number of digits to be converted, the conversion routine is tailored to effectively filter out or ignore the precursor sentence portion of the particular response message being received, so that only the actual digits of the parametric data portion of the reply message will be processed by the speed-to-text conversion routine. The resulting digitized numeric character data is then stored in a relational digital database for subsequent processing.

Once polling of the usage parameter registers of the accessed DATU has been completed, the usage parameter registers are cleared, and the DATU and the polling processor up, terminating the connection. With digitized usage data downloaded to the usage-monitoring processor's database, the polling processor increments to the next test unit in the DATU dialing directory, and repeats the sequence described above for the remaining test units listed, thereby compiling usage data for each of the test units of the directory. The compiled usage parameter data that has been stored in the relational database can then be processed in accordance with a statistical analysis (spreadsheet) program, from which usage reports are readily generated using standard query language (SQL) programming.

DETAILED DESCRIPTION

Figure 1:
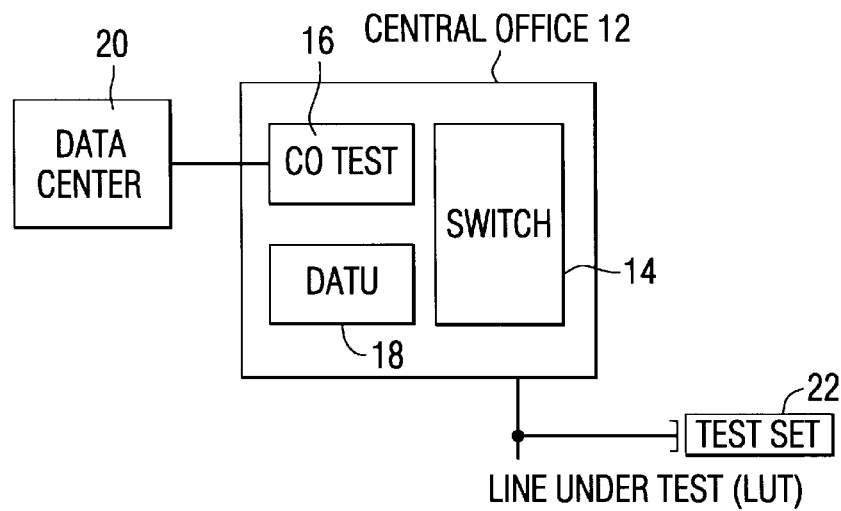
FIG. 1 diagrammatically illustrates a conventional telephone network facility having a central office switch, test devices, and a direct access test unit or DATU.

Before describing in detail the automated DATU polling scheme of the present invention, it should be observed that the invention resides primarily in what is effectively a prescribed arrangement of conventional communication circuits and associated digital signal processing components and an attendant supervisory control program therefor, that controls the operations of such circuits and components. Consequently, the configuration of such circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustration and associated flow charts of the DATU polling control program to be described are primarily intended to show the major components of the system in a convenient functional grouping and processing sequence, whereby the present invention may be more readily understood.

Figure 2:
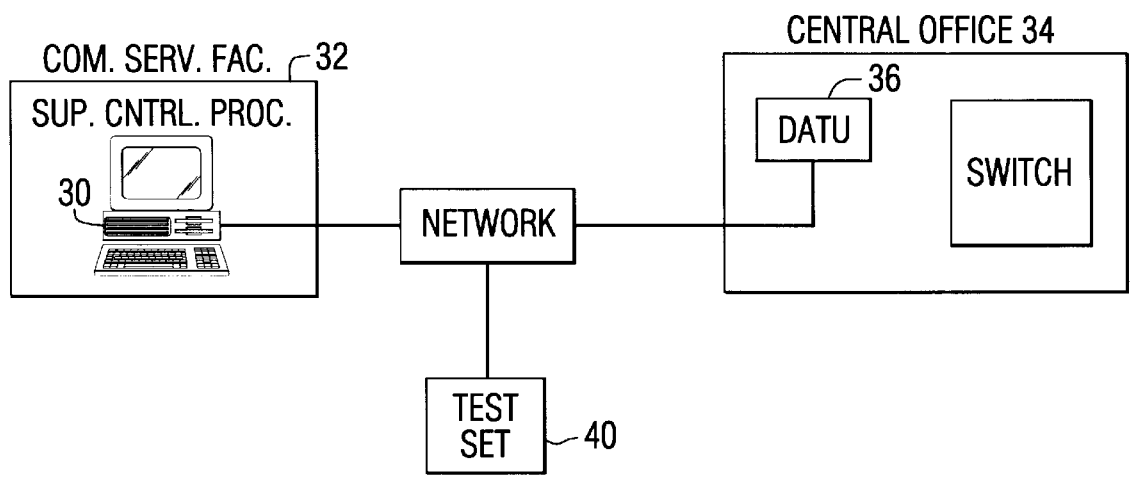
FIG. 2 is a subsystem diagram showing a supervisory polling control processor programmed to execute the DATU usage monitoring routine of the present invention.

A preferred embodiment of the test unit usage scheme of the present invention will now be described with reference to the subsystem diagram of FIG. 2 and the flow chart of FIG. 3. The flow chart of FIG. 3 diagrammatically illustrates the sequence of steps that are executed by a DATU usage polling processor for automatically querying respective registers of direct access test units of respective telephone facilities, in which data representative of usage by the test units are stored until cleared by system personnel.

As described previously, the usage monitoring routine of the present invention may be located in any facility from which calls may be placed to respective stations of a telephone network in which test units are installed. The usage monitoring facility itself need not be part of the network, per se. For purposes of a non-limiting example, the subsystem diagram of FIG. 2 shows a supervisory polling control processor 30, which is programmed to execute the usage monitoring routine of the invention. The polling control processor may be installed in a communications service facility 32, that is separate from central offices of the network, one of which is shown at 34, in which one or more line-conditioning DATUs 36, are installed, as described above with reference to FIG. 1.

As noted previously, each line-conditioning device (DATU) 36 is configured and programmed to interactively apply one or more line-conditioning signals to a telephone line under test, and thereby enable the field technician to selectively conduct a number of tests of a line, by keying in combinations (sequences) being invoked from a craftsperson's telephone test set 40. In response to these keyed commands, the test set outputs DTMF signals to which the DATU 36 responds. Reply messages sourced from a DATU 36 to the test set 40 are formatted as synthesized voice signals, which may be audibly reproduced via the test set speaker, or may be visually displayed on a personal digital assistant device, as described in the above-referenced Chan et al patents. Each DATU also includes a set of usage data registers/counters that are incremented at each access from a test set, and thereby allow the telephone service provider to monitor the DATU's usage for maintenance purposes.

Figure 3:
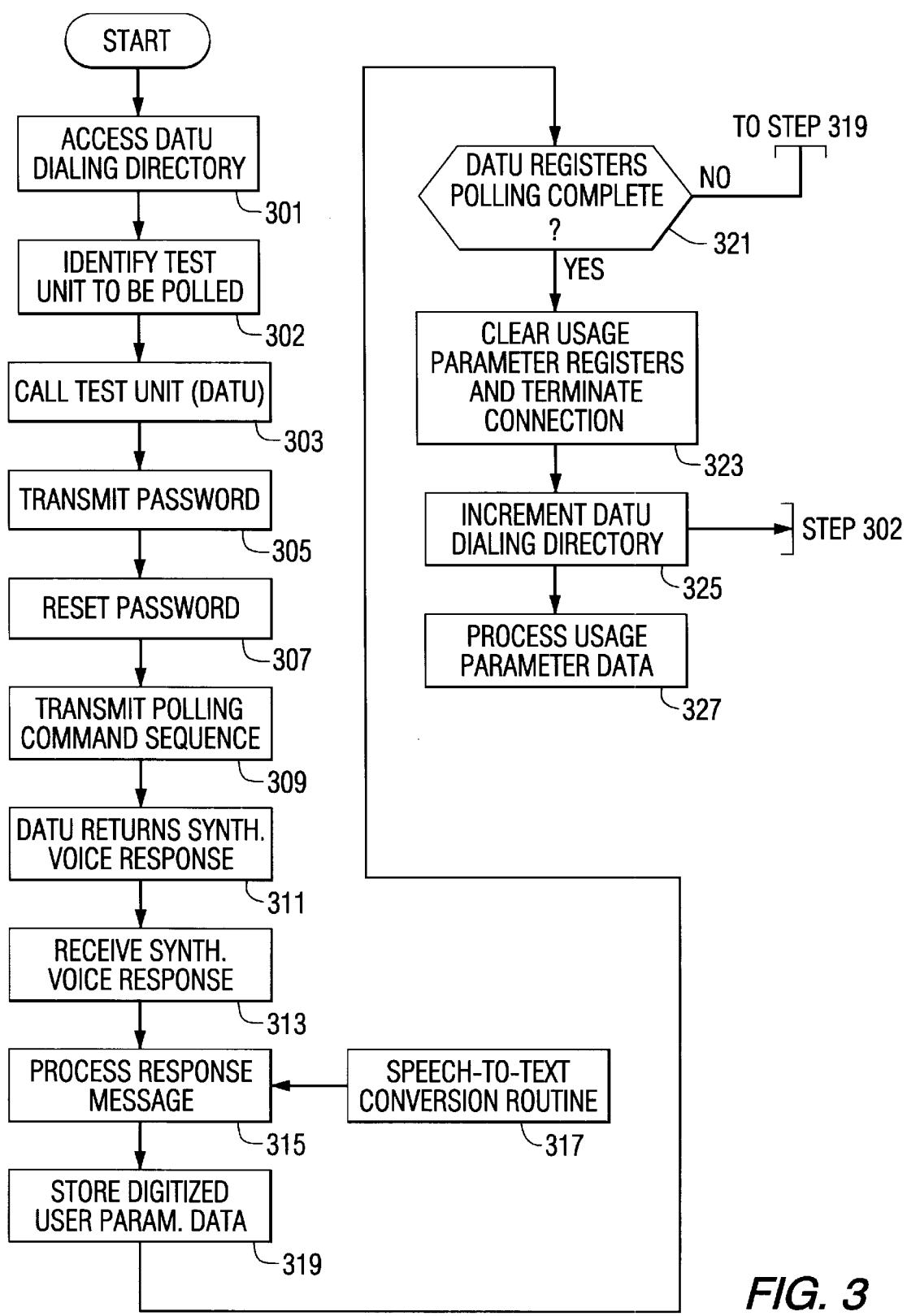
FIG. 3 is a flow chart illustrating sequence of steps executed by the DATU usage polling processor of FIG. 2 for automatically querying respective registers of direct access test units of respective telephone facilities.

Referring to the communication flow sequence of FIG. 3, the routine starts with step 301, wherein the control processor 30, containing the usage monitoring routine of the invention, accesses a dialing directory of test units contained in a usage monitoring or DATU polling database. Also entered in the DATU database are polling parameters that may include, but are not necessarily limited to, the time of day/night at which the DATUs are to be queried/polled, the frequency at which the polling is to take place (e.g., weekly, monthly), and a task list of action items to be executed (e.g., usage data acquisition, setting/clearing operational parameters, change in password of the accessed test unit), once a call has been successfully placed to a test unit.

In step 302, the routine accesses the directory number associated with a first test unit to be polled. Once the test unit to be called is identified, a call is placed to that test unit in step 303. As noted previously, call placement and information access signalling from the usage monitoring processor is accomplished via a first (DTMF) signalling format, to which the microcontroller of the test unit has been configured to respond. Messages sourced from the test unit are generated in synthesized voice signals as a second signalling format. The usage monitoring (polling control) processor 30 employs a speech-to-text conversion routine to translate the synthesized voice messages transmitted from the queried test unit into a digitized text format for storage and subsequent analysis. As a non-limiting example, the speech-to-text conversion routine may comprise a commercially available digit-to-text conversion routine, such as "C"-based voice recognition software available from Dialogic Inc., which employs a voice library that is relatively robust with respect to noise and variations in pitch, volume and inflection. As will be described, a useful feature of this conversion routine is the fact that it is programmable with respect to when the conversion process is to begin and the number of digits to be converted. This allows the routine to be customized so that it converts only a prescribed portion of a synthesized voice response message from the queried test unit.

When the test unit (DATU 36) answers, and a connection is established between it and the usage monitoring processor 30, the routine proceeds to access the usage information storage space (usage parameter registers) of the test unit. For this purpose, in step 305, a password that allows access to stored test unit information is transmitted from the polling processor. Once access is accepted by the DATU, the password is reset in step 307, and the routine proceeds to step 309, wherein the polling processor transmits a DTMF command sequence associated with a particular usage parameter stored by the DATU.

As described above, the DATU contains a number of usage parameter registers that store various usage parameter data. One of these registers stores information representative of the number of times that the test unit has been accessed over a defined time interval, namely, between usage polls. Other registers store additional information, such as the contents of the job counter, and the contents of the single line access counter. (Obtaining the contents of the job counter during the usage poll is important, since the DATU may have performed one or more jobs during the usage poll access.

Figure 4:
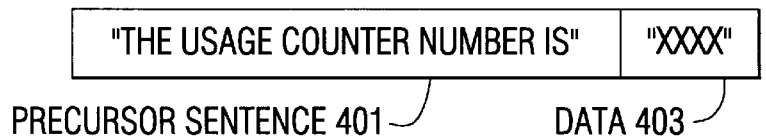
FIG. 4 diagrammatically illustrates the format of a synthesized voice, usage parameter response message generated by a polled DATU.

In step 311, the queried test unit generates a synthesized voice response message that is associated with the particular usage parameter register being accessed by the sequence of usage query command tones received from the usage monitoring processor. As noted earlier, and as diagrammatically illustrated in FIG. 4, the format of a synthesized voice, usage parameter response message generated by the polled DATU 36 includes a precursor sentence portion 401 of a prescribed duration, followed by a parametric data portion 403 containing a sequence of raw numeric characters or digits.

Since the duration of each precursor sentence portion 401 is known, and the speech-to-text conversion routine is programmable with respect to when the conversion process is to begin and the number of digits to be converted, the conversion routine is tailored to effectively filter out or ignore the precursor sentence portion of the particular response message being received, so that only the actual digits of the parametric data portion 403 will be processed by the speed-to-text conversion routine, and stored.

In step 313, the synthetically voiced response message from the DATU is received by the usage monitoring processor, and then applied in step 315 to the speech-to-text conversion routine 317, which converts the synthetically voiced usage parameter digits of the message received from the DATU into digitized usage data. In step 319, the digitized usage parameter digits are stored in a relational digital database for subsequent processing. In query step 321, a determination is made as to whether polling of the usage parameter registers of the accessed DATU has been completed. If not, the routine loops back to step 309 and repeats the above process for the next parameter of interest. If the answer to step 321 is YES, the routine transitions to step 323, in which a message is transmitted to the DATU to clear the usage registers, whose contents have been accessed by the command sequence described above. The DATU 36 and the polling processor 30 then hang up, terminating the connection.

With digitized usage data downloaded to the usage-monitoring processor's database, then in step 325, the processor increments or steps to the next test unit in the DATU dialing directory, and repeats the sequence described above for the remaining test units listed, thereby compiling usage data for each of the test units of the directory. In step 327, compiled usage parameter data that has been stored in the relational database in step 319 is processed in accordance with a statistical analysis (spreadsheet) program, from which usage reports are readily provided using standard query language (SQL) programming.

As will be appreciated from the foregoing description, the shortcomings of conventional manual access to usage registers of test units of a telephone network are effectively obviated by the automatic polling system of the present invention which is programmed to execute a polling routine that sequences through a dialing directory listing test units of the network. When sequentially stepping through the dialing directory, the polling processor is operative to generate tone signal-formatted commands to which polled test units respond with synthesized voice messages containing usage parameter data. Using a speech-to-text conversion operator, the processor converts synthesized voice responses from queried test units into digital data for storage in a relational database, from which usage reports are derived.

While I have shown and described an embodiment in accordance with the present invention, it is to be understood that the same is not limited thereto but is susceptible to numerous changes and modifications as are known to a person skilled in the art, and I therefore do not wish to be limited to the details shown and described herein, but intend to cover all such changes and modifications as are obvious to one of ordinary skill in the art.

What is claimed:

1. A method of monitoring the usage of a remotely accessible test unit of a communication system facility, said test unit being operative to supply test instruction messages to a craftsperson's test set in a first signal format, and to apply test signals to a communication link to be tested, in response to test request signals supplied from said test set in a second signal format, said method comprising the steps of
   (a) accessing said test unit and causing said test unit to generate, in said first signal format, at least one usage message representative of usage of said test unit;
   (b) receiving said at least one usage message and converting said first signal format of at least one usage message into a digitized data format for storage in a digital database;
   (c) storing said digitized usage data in said digital database; and
   (d) processing said digitized usage data in accordance with a statistical data processing routine to derive a measure of usage of said test unit.

2. A method according to claim 1, wherein said first signal format comprises synthesized voice signal format, and wherein step (b) comprises converting said synthesized voice signal format into digitized text data.

3. A method according to claim 2, wherein said second signal format comprises tone signal format.

4. A method according to claim 1, wherein said at least one usage message comprises a plurality of usage messages respectively representative of different usage aspects of said test unit.

5. A method according to claim 1, wherein said plurality of usage messages include messages representative of the number of times said test unit has been accessed by one or more test sets over a prescribed duration.

6. A method according to claim 1, wherein said plurality of usage messages include messages representative of the number of times said test unit has been accessed by one or more test sets, since last being accessed to generate said at least one usage message.

7. A method according to claim 1, wherein step (a) comprises automatically accessing a dialing directory of test unit directory numbers to sequentially access the respective test unit directory numbers stored therein and, for each respectively accessed directory number, calling its associated test unit and causing said associated test unit to generate said at least one usage message representative of usage of said test unit.

8. A method of monitoring the usage of a remotely accessible test unit installed in a communication system facility, said test unit being response to tone signals supplied thereto to output information that is conveyed to a craftsperson's communication device, for availability to said craftsperson in the course of said craftsperson inputting commands to said craftsperson's communication device to invoke the operation of said test unit, said method comprising the steps of:

(a) from a location remote with respect to said communication system facility, automatically placing calls to respective test units of one or more communication system facilities;

(b) generating a sequence of signals which cause said called test units to generate synthesized voice signals containing information representative of usage of said test units;

(c) receiving said synthesized voice signals and converting said synthesized voice signals into digitally encoded text signals;

(d) storing said digitally encoded text signals in a digital database; and (e) processing said digitally encoded text signals stored in said digital database to produce a digitally formatted representation of statistical usage characteristics of said test units.

9. A method according to claim 8, wherein a respective test unit comprises a direct access test unit which is operative to generate synthesized voice signals in response to predetermined sequences of tone signals.

10. A method according to claim 9, wherein said direct access test unit is operative to place predetermined conditions on a telephone line under test in response to receiving preselected tone signals from a craftsperson's test set, so as to allow said craftsperson's test set to test set telephone line by calling said direct access test unit from said test set and invoking prescribed testing operations of said direct access test unit by entering commands in response to testing instruction messages from said direct access test unit.

11. A method according to claim 10, wherein said test instruction messages include synthesized voice messages.

12. A method according to claim 8, wherein said sequence of tone signals is operative to cause said test unit to generate synthesized voice reply messages representative of respectively different usage information.

13. A method according to claim 12, wherein step (c) comprises selectively filtering synthesized voice messages generated in step (b) to extract only a portion of said synthesized voice messages, and converting only said portion of said synthesized voice messages into digital format, and wherein step (d) comprises storing said portion of said synthesized voice messages that have been converted into digital format.

14. A method according to claim 13, wherein said synthesized voice messages include a precursor information and usage parameter data, and wherein said portion corresponds to said usage parameter data.

15. A method according to claim 14, wherein said usage parameter data includes numeric data.

16. A method according to claim 12, wherein said respectively different usage information includes information representative of the number of time that said test unit has been accessed over a defined time interval, job identification, and line number identification.

17. A method according to claim 12, wherein said respectively different usage information includes information representative of the number of times said test unit has been accessed by one or more test sets, since last being accessed to generate information representative of usage of said test unit.

18. A method of monitoring the usage of a remotely accessible test units installed in communication system facilities, said test units being response to signals of a first signal format supplied thereto from a craftsperson's communication device, to output information signals of a second signal format that are conveyed to said craftsperson's communication device, for availability to said craftsperson in the course of said craftsperson inputting commands to said craftsperson's communication device to invoke the operation of said test unit for testing communication lines, said method comprising the steps of:

(a) from a location remote with respect to said communication system facilities, exercising a routine that automatically calls respective ones of said test units of said communication system facilities identified in a test unit identification database;

(b) having successfully placed a call to a respective test unit in step (a), generating a sequence of signals of said first signal format which cause said respective test unit to generate signals of said second signal format containing information representative of usage of said respective test unit;

(c) receiving said signals of said second signal format generated in step (b) and converting said received signals into digitally encoded signals;

(d) storing said digitally encoded signals in a digital database; and (e) processing said digitally encoded signals stored in said digital database to produce a digitally formatted representation of statistical usage characteristics of said respective test unit.

19. A method according to claim 18, further including the step (f) of repeating steps (a)–(e) for others of said test units of said communication system facilities identified in a test unit identification database.

20. A method according to claim 18, wherein said first signal format comprises synthesized voice signal format, and wherein step (c) includes converting said received signals into digitally encoded text signals.

21. A method according to claim 19, wherein said second signal format comprises tone signal format.

22. A method according to claim 18, wherein said information representative of usage of said respective test unit is representative of different usage aspects of said respective test unit.

23. A method according to claim 18, wherein said information representative of usage of said respective test unit is representative of the number of times said respective test unit has been accessed by one or more test sets over a prescribed duration.

24. A method according to claim 18, wherein said information representative of usage of said respective test unit is representative of the number of times said respective test unit has been accessed by one or more test sets, since last being accessed to generate usage information.

25. A system for automatically querying direct access test units of respective telephone facilities that are used for conditioning and testing telephone lines, and thereby obtain data representative of usage by the test units, said system comprising a polling processor programmed to execute a polling routine, which sequences through a dialing directory listing test unit of the network to be polled, said polling processor including a tone generator which is operative to generate tone signal-formatted commands to which polled test units respond with synthesized voice messages containing usage parameter data, said polling processor further including a speech-to-text conversion operator, which is operative to convert synthesized voice responses from queried test units into digital data for storage in a database, from which usage reports are derived.

26. A system according to claim 25, wherein said test units comprise direct access test units.

* * * * *